United States Patent
Nicolas et al.

(10) Patent No.: US 11,270,815 B2
(45) Date of Patent: Mar. 8, 2022

(54) HYBRID CABLE WITH CONNECTING DEVICE

(71) Applicant: SERCEL, Carquefou (FR)

(72) Inventors: Frédéric Nicolas, Saint Etienne de Montluc (FR); Oleg Valishin, Carquefou (FR); Florent Guichard, Nantes (FR)

(73) Assignee: SERCEL, Carquefou (FR)

( * ) Notice: Subject to any disclaimer, the term of this patent is extended or adjusted under 35 U.S.C. 154(b) by 0 days.

(21) Appl. No.: 16/866,826

(22) Filed: May 5, 2020

(65) Prior Publication Data

US 2021/0350953 A1 Nov. 11, 2021

(51) Int. Cl.

| H01B 7/17 | (2006.01) |
|---|---|
| H01B 9/00 | (2006.01) |
| E21B 17/00 | (2006.01) |
| E21B 17/02 | (2006.01) |
| E21B 47/00 | (2012.01) |
| E21B 49/00 | (2006.01) |
| G02B 6/44 | (2006.01) |
| E21B 47/12 | (2012.01) |

(52) U.S. Cl.
CPC ........... *H01B 9/005* (2013.01); *E21B 17/003* (2013.01); *E21B 17/028* (2013.01); *E21B 47/00* (2013.01); *E21B 49/00* (2013.01); *G02B 6/443* (2013.01); *G02B 6/4471* (2013.01); *H01B 7/17* (2013.01); *E21B 47/12* (2013.01)

(58) Field of Classification Search
CPC .......... H01B 7/17; H01B 7/221; H01B 9/025; H01B 9/005; H01B 11/1041; H01B 11/22; G02B 6/3817
See application file for complete search history.

(56) References Cited

U.S. PATENT DOCUMENTS

| 4,675,474 A * | 6/1987 | Neuroth | H01B 7/046 156/51 |
| 4,780,574 A * | 10/1988 | Neuroth | H01B 7/046 156/52 |
| 6,255,592 B1 * | 7/2001 | Pennington | E21B 17/206 174/103 |

(Continued)

FOREIGN PATENT DOCUMENTS

| EP | 0469343 A1 | 2/1992 |
| EP | 2270564 A1 | 1/2011 |

(Continued)

OTHER PUBLICATIONS

Extended European Search Report in corresponding/related European Patent Application No. 21305575.9 dated Oct. 15, 2021.

*Primary Examiner* — Chau N Nguyen

(74) *Attorney, Agent, or Firm* — Patent Portfolio Builders PLLC

(57) ABSTRACT

A hybrid cable for collecting data inside a well includes an electrical cable extending along a longitudinal axis of the hybrid cable, an optical fiber extending along the longitudinal axis, an armor that extends along the longitudinal axis, and encircles the electrical cable and the optical fiber, and a connecting device extending along the longitudinal axis, to enclose the electrical cable and the optical fiber, and to be enclosed by the armor. The connecting device has an unsmooth external surface.

18 Claims, 17 Drawing Sheets

(56) References Cited

U.S. PATENT DOCUMENTS

| | | | |
|---|---|---|---|
| 6,343,172 B1 * | 1/2002 | Schiestle | G02B 6/4416 385/101 |
| 6,664,474 B1 * | 12/2003 | Gunnels | H01B 11/1895 174/75 C |
| 7,049,506 B2 * | 5/2006 | Head | E21B 17/028 174/36 |
| 8,726,980 B2 * | 5/2014 | Varkey | H01B 7/046 166/66.4 |
| 9,523,790 B1 | 12/2016 | Valishin | |
| 9,594,226 B2 * | 3/2017 | Blazer | G02B 6/443 |
| 10,472,910 B2 | 11/2019 | Varkey et al. | |
| 2012/0046866 A1 | 2/2012 | Meyer et al. | |
| 2018/0374607 A1 * | 12/2018 | Hernandez Marti | G02B 6/443 |

FOREIGN PATENT DOCUMENTS

| | | | |
|---|---|---|---|
| JP | H09127380 A | 5/1997 |
| RU | 183643 U1 | 9/2018 |
| WO | 9422039 A1 | 9/1994 |

* cited by examiner

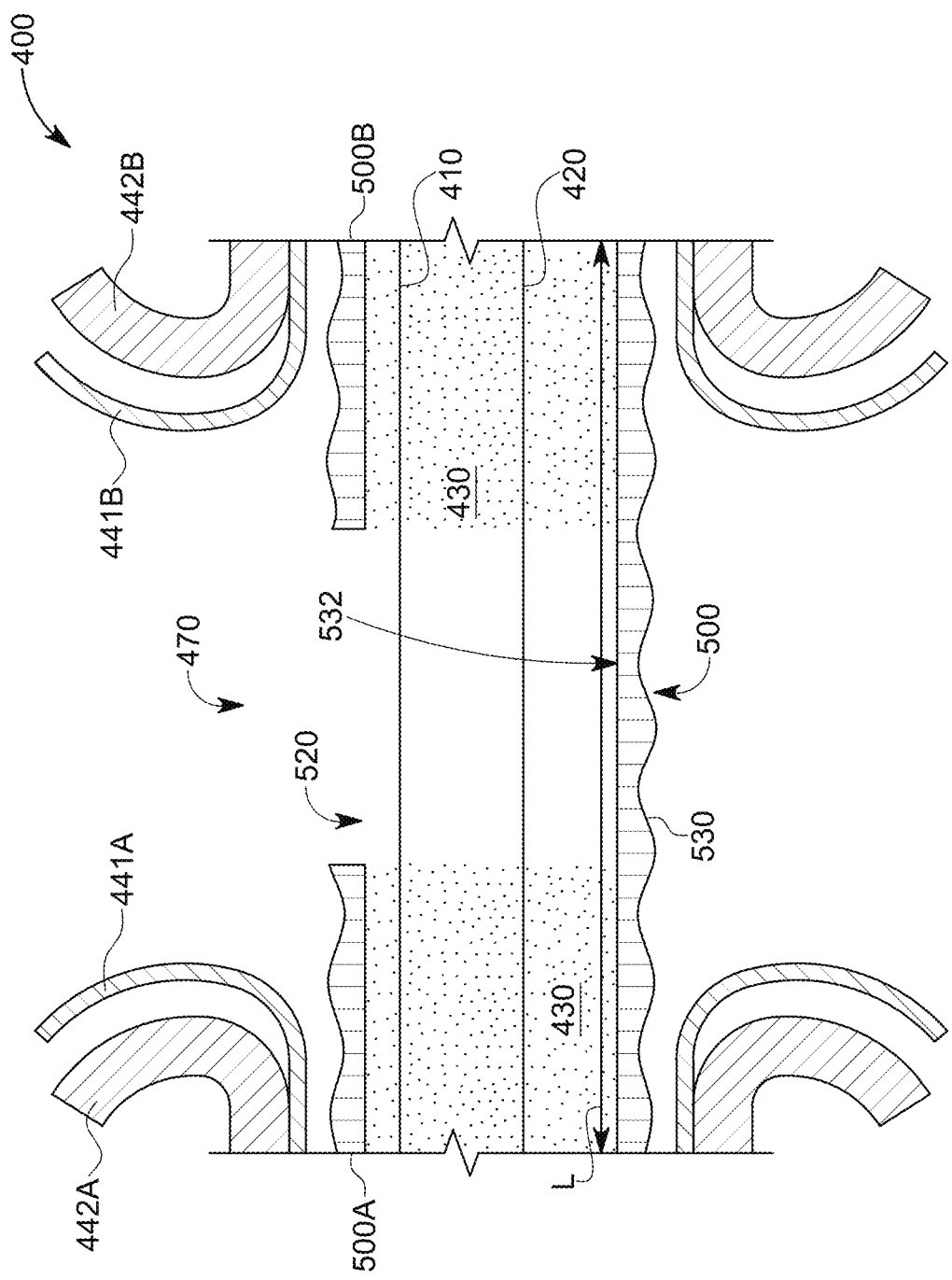

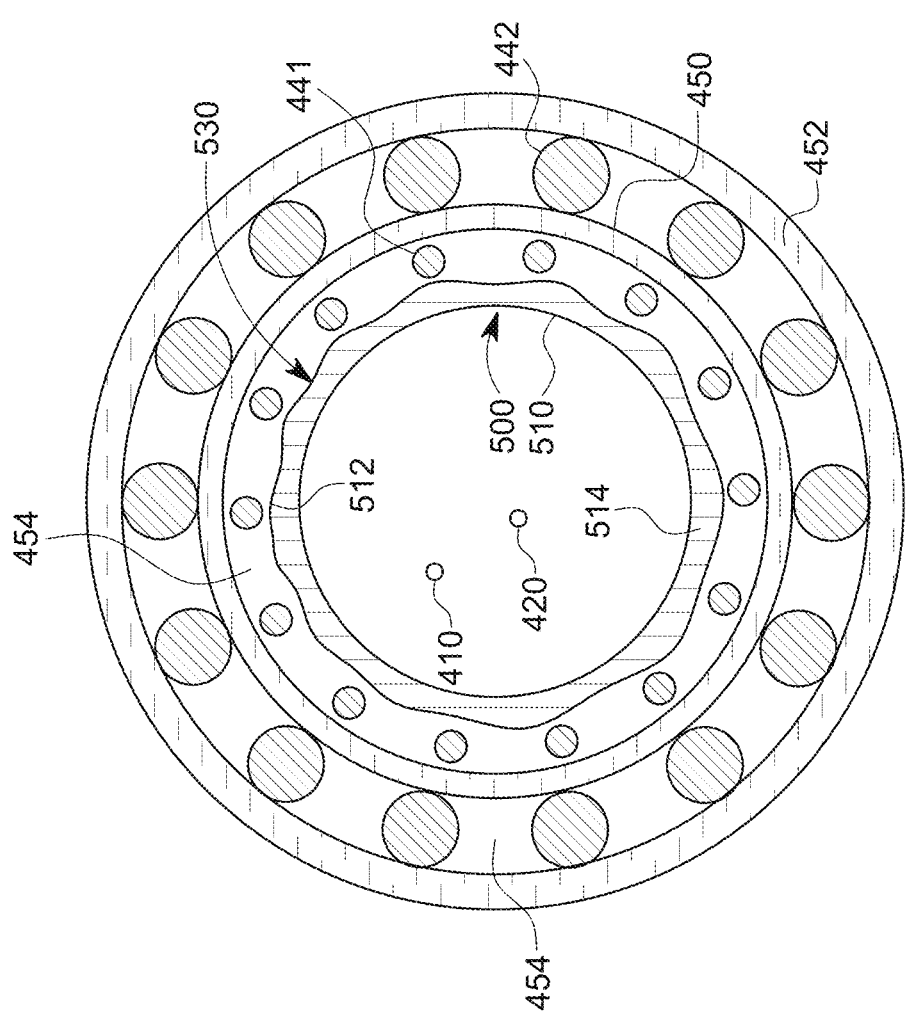

HYBRID CABLE WITH CONNECTING DEVICE

BACKGROUND

Technical Field

Embodiments of the subject matter disclosed herein generally relate to a connecting device and method for getting access to an electrical cable, or a fiber optic cable, or both, and more specifically, to adding a connecting device to a hybrid cable for getting access to a signal that is transmitted through the hybrid cable.

Discussion of the Background

To extract hydrocarbon fluids (e.g., oil and gas) from a geological formation that is located underground (subsurface), a well needs to be drilled into the earth, either below the water (in a marine environment) or at the earth's surface (land environment). In both situations, various drilling equipment needs to be lowered into the well, most of the times at depths at which the ambient temperatures and pressures are so high that available electronic components are quickly damaged. After the drilling phase, the well is exploited, which means that other type of equipment needs to be installed to allow the hydrocarbon fluids to exit the underground formation. During this production phase, the flow of hydrocarbon fluids needs to be monitored, i.e., measured with various electronic components.

When the hydrocarbon fluid production decreases, there are available methods (e.g., injection of various fluids that promote the flow of hydrocarbon fluids) for enhancing the oil recovery. These methods require different equipment and knowledge of the well.

All these methods share the need to monitor the well, to know the various parameters (e.g., temperature, pressure, density, flow, etc.) of the well and its surrounding, so that the appropriate tool can be deployed in the well and the well is appropriately managed.

There are many devices and systems for measuring/monitoring the parameters of the well and/or around the well. The traditional device is a temperature and/or pressure tool, which is attached to an electrical cable and lowered into the well for measuring the temperature and/or pressure.

Another traditional device that is deployed inside a well is a seismic sensor, e.g., a geophone. Seismic sensors may be deployed, also attached to a cable, inside the well for measuring seismic signals, either associated with micro-seismic events that happen in the earth, or for measuring seismic signals that are generated by a seismic source at the surface, and then reflected from various geophysical formations underground. The micro-seismic events may be generated due to hydraulic fracturing, or to the extraction of hydrocarbon fluid from underground and the subsequent rearranging of the ground. The seismic source is a man-made source specifically designed to generate acoustic signals that propagate to the geophysical formations of interest and the reflected waves are recorded by the seismic sensors for generating an image of these geophysical formations.

In an effort to overcome the weaknesses of the electronic components of the underground sensors, a new technology has recently been introduced to the oil and gas field. This new technology, distributed acoustic sensing (DAS), uses one or more optical fibers for measuring various parameters inside the well. For an introduction to this technology, see U.S. Patent Application Publication No. 2012/0046866. One advantage of the DAS is that the optical fiber can withstand a high temperature environment much better than the existing electronic components. However, this technology has various limitations on its own, e.g., the need to associate the value of a measured parameter with its actual location underground, whereas an actual location of the measured parameter is not that precise compared to the physical location of the seismic sensor tools, the optical fiber is linear and continuous, without dedicated sensing points. Moreover, the step of data processing is difficult, especially since the measurement concerns an optical constraint (and not a direction of movement), which has to be correlated to useful seismic data.

The assignee of this application has merged the two technologies, i.e., the traditional electronic sensors and the DAS technology, as discussed in U.S. Pat. No. 9,523,790. In this patent, as illustrated in FIG. 1, which corresponds to FIG. 1 of the patent, a hybrid sensing apparatus 100 includes an optical sensing component 110 and an electric sensing component 130. The optical sensing component 110 includes at least an optical cable 112 while the electric sensing component 130 includes at least one sensor 132 that measures a parameter inside the well and generates an electric signal indicative of the measured parameter.

FIG. 1 shows the electrical sensing component 130 extending, inside the well, parallel to the optical cable 112 for a length L1, turning around (U-turn), and then extending anti-parallel to the optical cable 112 for a length L2. FIG. 1 shows hybrid sensing apparatus 100 having a hybrid cable 114 that includes the optical cable 112 and an electrical cable 134. Hybrid cable 114 extends from a head 154A of the well 154, inside the well. Electrical cable 134 extends from a controller 150, located on ground 152, to a telemetry unit 136, located in the well 154. Electrical cable 134 may be a traditional copper cable, a heptacable, or any other cable that is currently being used inside a well. Electrical cable 134 may transmit electrical power and/or data to and from sensor 132. Controller 150 may include a processor 156 and a memory 158 that are connected to optical component 110 and electrical cable 134. Controller 150 may also include a power source 160 or it may be connected to a power source.

Electrical cable 134 is electrically connected, through an electrical element 138, to another electrical cable 140 that directly electrically (and mechanically) connects to sensor 132. In this way, sensor 132 can receive power from controller 150 and can exchange data and/or commands with controller 150. Electrical cable 134, telemetry unit 136, electrical cable 140, and sensor 132 form the electrical component 130.

FIG. 1 further show that sensors 132 are mechanically coupled, through attachment 142, to hybrid cable 114. This allows the weight of sensors 132 to be supported by hybrid cable 114, so that electric cable 140, for the length L2, can be designed and dimensioned only for transmission of data and power and not for supporting the load of the sensors.

Note that the electrical cable 134 and electrical cable 140 are anti-parallel to each other and sensors 132 extend from the telemetry unit 136 upwards, toward the ground 152. This specific configuration limits the applicability of the DAS system.

Thus, there is a need for a device and method that overcome the above noted limitations and also provide accurate downhole measurements. Further, there is a need that the hybrid cable is in direct contact with the well, at least at some points, so that a measurement obtained with the optical fiber is improved.

SUMMARY

In various embodiments, a hybrid cable, preferably used, as shown, as a wireline, is provided for measuring one or more parameters associated with oil and gas exploration.

In one embodiment, there is a hybrid cable or wireline for collecting data inside a well. The hybrid cable includes an electrical cable extending along a longitudinal axis of the hybrid cable, an optical fiber extending along the longitudinal axis, an armor that extends along the longitudinal axis, and encircles the electrical cable and the optical fiber, and a connecting device extending along the longitudinal axis, to enclose the electrical cable and the optical fiber, and to be enclosed by the armor. The connecting device has an unsmooth external surface.

In another embodiment, there is a system for taking out a signal from a hybrid cable. The system includes a connecting device extending along a longitudinal axis and having a through slot. The connecting device is configured to enclose an electrical cable and an optical fiber that form the hybrid cable, and to be enclosed by an armor that is part of the hybrid cable. The system further includes a take-out port configured to fit into the through slot, the take-out port being configured to have a pad on an external surface. The connecting device has an unsmooth external surface, and the take-out port is configured to host a lead that extends from the electrical cable or the optical fiber to the pad.

In still another embodiment, there is a method for adding a take-out port to a hybrid cable. The method includes cutting armoring elements of the hybrid cable to expose an electrical cable and an optical fiber, adding swage bands over corresponding plural ends of the hybrid cable, inserting a connecting device to enclose the electrical cable and the optical fiber, wherein the external surface of the connecting device is unsmooth, laying the plural ends of the armoring elements along the unsmooth external surface of the connecting device, swaging the swage bands and the plural ends of the armoring elements against the unsmooth external surface so that the swage bands and the plural ends conform to the unsmooth external surface of the connecting device.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 5A to 5E show the placement of a connecting device along the hybrid cable to take out an electrical and/or optical signal;

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. In various embodiments as illustrated in the figures, an apparatus and method for taking out an electrical signal and/or an optical signal from a hybrid cable, or wireline, is discussed. The hybrid cable is lowered into a well for collecting data related to the well. However, the invention is not limited to a well, but it may be used for other seismic exploration cases, for example, 4D seismic surveys.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
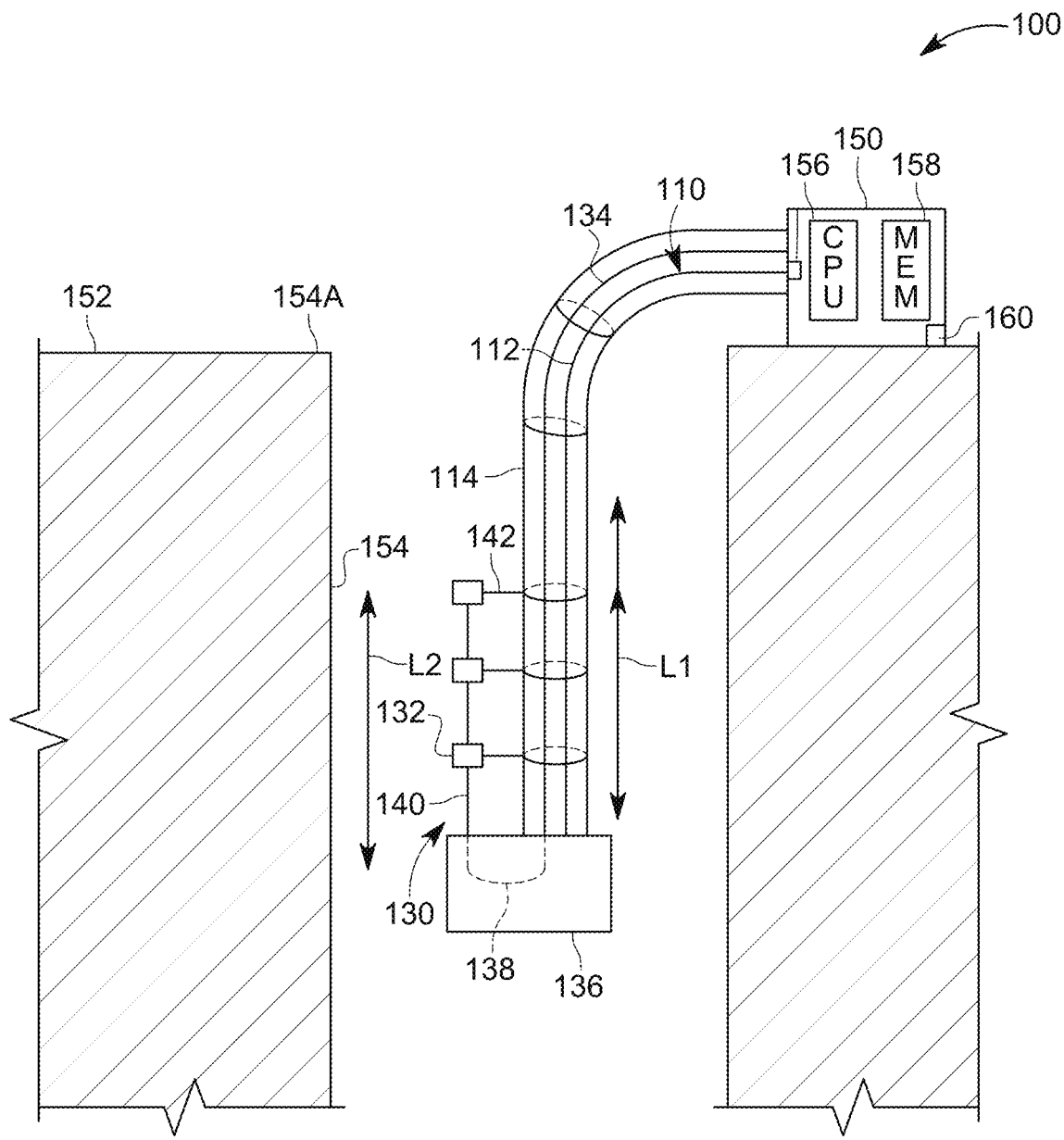
FIG. 1 illustrates a hybrid sensing apparatus deployed in a well.
Figure 2:
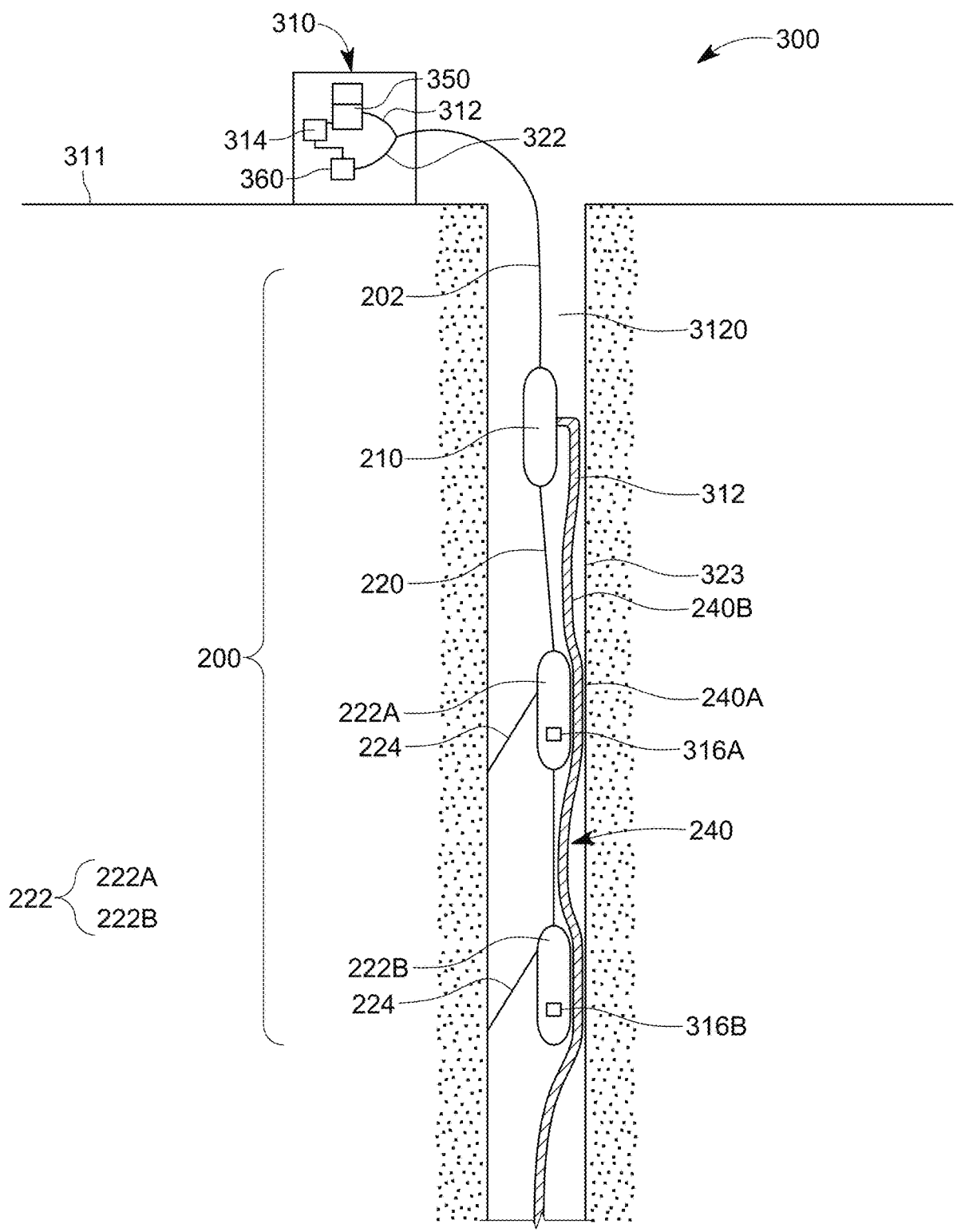
FIG. 2 illustrates a vertical seismic profile (VSP) system that uses a hybrid sensing apparatus inside of a well.
Figure 9:
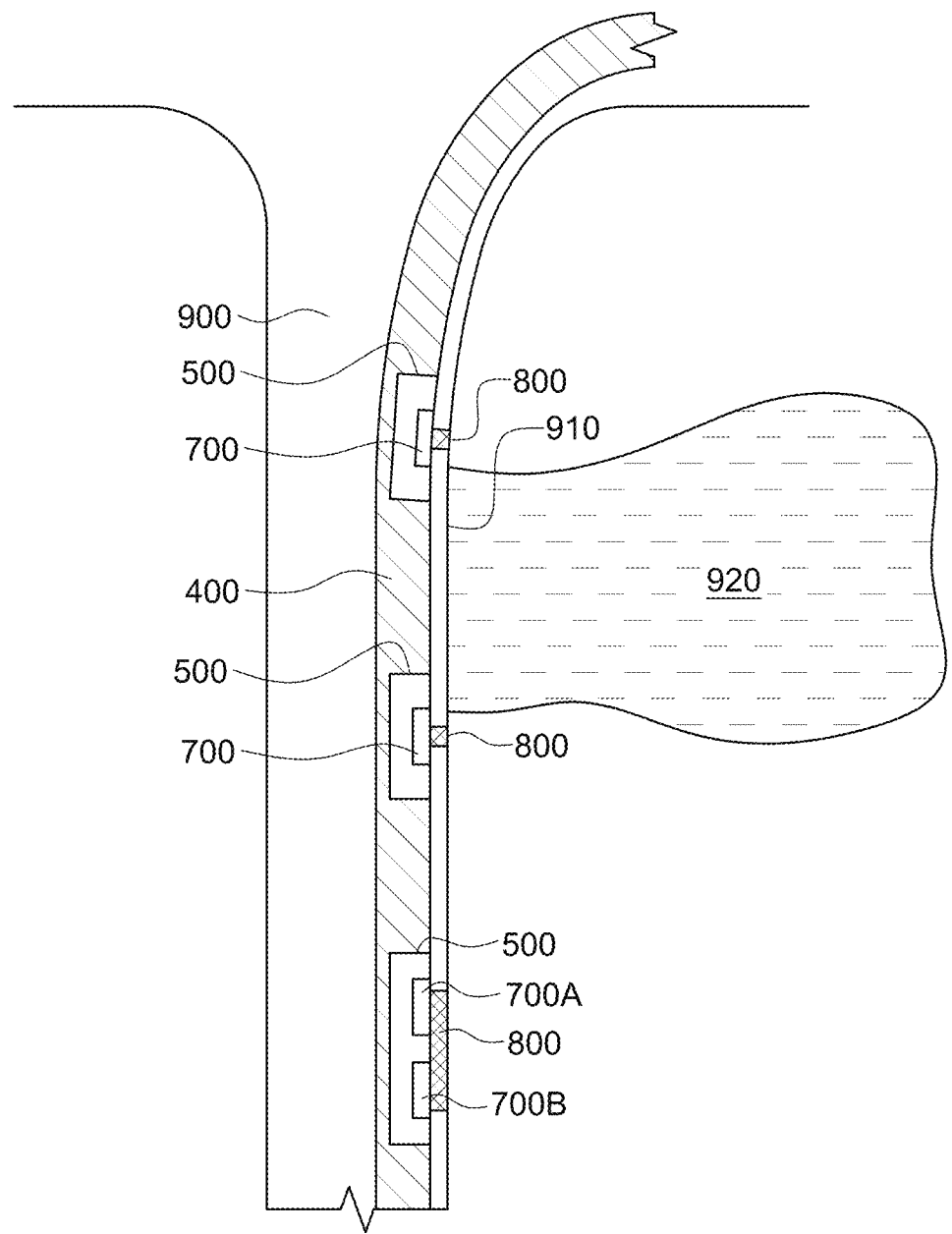
FIG. 9 illustrates the hybrid cable with the external device deployed inside a well.

Prior to discussing the invention, a configuration of a hybrid sensing apparatus deployed into a well is discussed with regard to FIG. 2, which corresponds to FIG. 9 of patent Ser. No. 16/217,396, filed on Dec. 12, 2018, and belonging to the same assignee as the present application. The hybrid sensing apparatus 200 may be deployed in a well as a VSP (vertical seismic profile) system 300. VSP system 300 includes a controller 310 that is connected to an electro-optical cable 202.

The hybrid sensing apparatus 200 includes an adaptor 210 that achieves a connection (mechanical, electrical and optical) between the electro-optical cable 202, an electrical cable 220, and an optical (or electro-optical) cable 240. The position of the adaptor within the well can be determined by adding a positioning tool (a gamma ray sensor, a casing collar locator, or the like) to the adaptor 210. A length of the electrical cable 220 could be the same, smaller or larger than a length of the optical cable 240. In one implementation, the optical cable 240 is longer than the electrical cable 220. An array 222 of probes 222A to 222B (only two are shown for simplicity, but the number of probes can be any number equal to or larger than 1) are distributed along the electrical cable 220, at known positions relative to the adaptor 210, so that their positions in the well are known with high accuracy since position of the adaptor 210 is known. The optical cable 240 is attached to the plural probes 222A to 222B through dedicated contact members.

Figure 3:
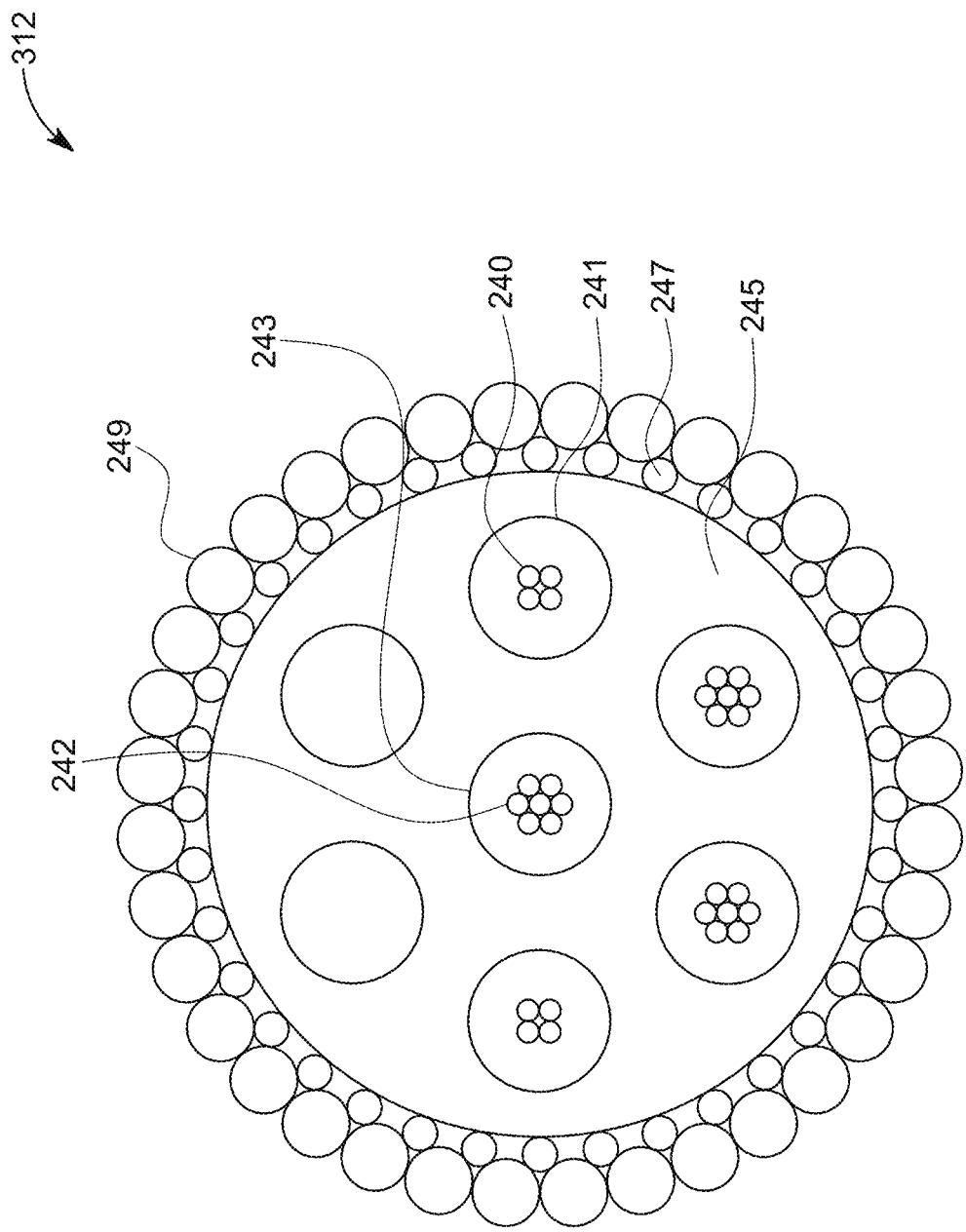
FIG. 3 illustrates a cross-section through a hybrid cable.

The controller 310 is placed at the surface 311 and includes the necessary equipment for supplying power and exchanging data with the discrete probes (only two shown in the figure for simplicity) of the array 222 of sensors and the optical cable 240. The optical cable 240 is split from the adaptor 210 and extends down into the well 320, in parallel to the electrical cable 220. In another embodiment, the electro-optical cable 202 may include one or more optical fibers packed together as an optical component 312 (including one or more optical fibers 240 provided in a sheath 241)

and one or more electrical cables 242 packed together in a corresponding sheath 243, as shown in FIG. 3. The optical fibers 240 and the electrical cables 242 may be placed together with their corresponding sheaths into a filler material 245, and the entire bundle may be surrounded with an armor formed of inner mechanical cables 247 and outer mechanical cables 249 (see FIG. 3), e.g., extending along the cable with opposing inclination angles of twist. The inner and outer mechanical cables 247 and 249 are part of the optical component 312.

One or more electrical components 322 may be provided inside the electro-optical cable 202. The optical component 312 and the one or more electrical components 322 may then be packed together inside a sheath. One or more strength members may be distributed around the sheath, which may be optional for ensuring that the weight of the array of sensors does not break or apply any tension to the electrical and optical components.

Returning to FIG. 2, it is noted that the discrete probes 222A and 222B have been fixed in place by actuating their arms 224. This means that a corresponding portion 240A of the optical cable 240 has an optimized coupling with the casing, e.g., it is pressed directly against the casing 323 of the well 320, as illustrated in FIG. 2. Note that another portion 240B of the optical cable 240, which is not anchored to a corresponding discrete probe, may not be in direct contact with the casing 323. The fact that portion 240A is in direct contact with the casing makes its measurement to be more accurate and can be correlated with the measurement performed by the corresponding discrete probe.

This intimate connection of plural portions of the DAS component with the well or casing, at least at certain points that correspond to the discrete probes, has one or more advantages as now discussed. With preferred optimized configurations, the direct connection between portions of the DAS component 312 and the casing 323 can provide a positioning accuracy to the optical fiber of the DAS component due to the known depth control of the discreet probes. This positioning accuracy can be achieved by a range of methods including but not limited to seismic transit time check, noise or heat trace detection of seismic probe adjacent to the fiber, or fiber deformation.

The controller 310 receives at least two sets of data, a first set 350 generated by the optical component 312 and a second set 360 generated by the sensors 316A, 316B of the discrete probe array 220. Both sets of data may include seismic information, and, as already noted above, the second set may be used to improve the accuracy of the first set. Further, by combining the two sets of data at the processor 314, the accuracy of the recorded seismic traces and their locations is improved. Any known method may be used for this combination.

The arrangement illustrated in FIG. 2 does not allow access to the electrical and/or optical signals being transferred along the electrical cable 220 or the optical fiber 240. Such access may be advantageous for installing one or more devices outside the electro-optical cable 202, for example, for powering with electrical energy an electromagnet so that the optical component 312 is intimately attached to the casing 323.

Thus, according to an embodiment of the invention, there is a connecting device that is configured to be attached between parts of the optical component 312, i.e., to be placed around the optical fibers 240 and the electrical cables 242 in FIG. 3. Further, the connecting device allows an electrical or optical or electro-optical connection between a take-out plug and the optical component to be made at any position along the optical component. The connecting device to be discussed next may be attached to existing optical components 312 or to existing electro-optical cables 202, or to new such cables. The connecting device is now discussed with regard to the figures.

Figure 4:
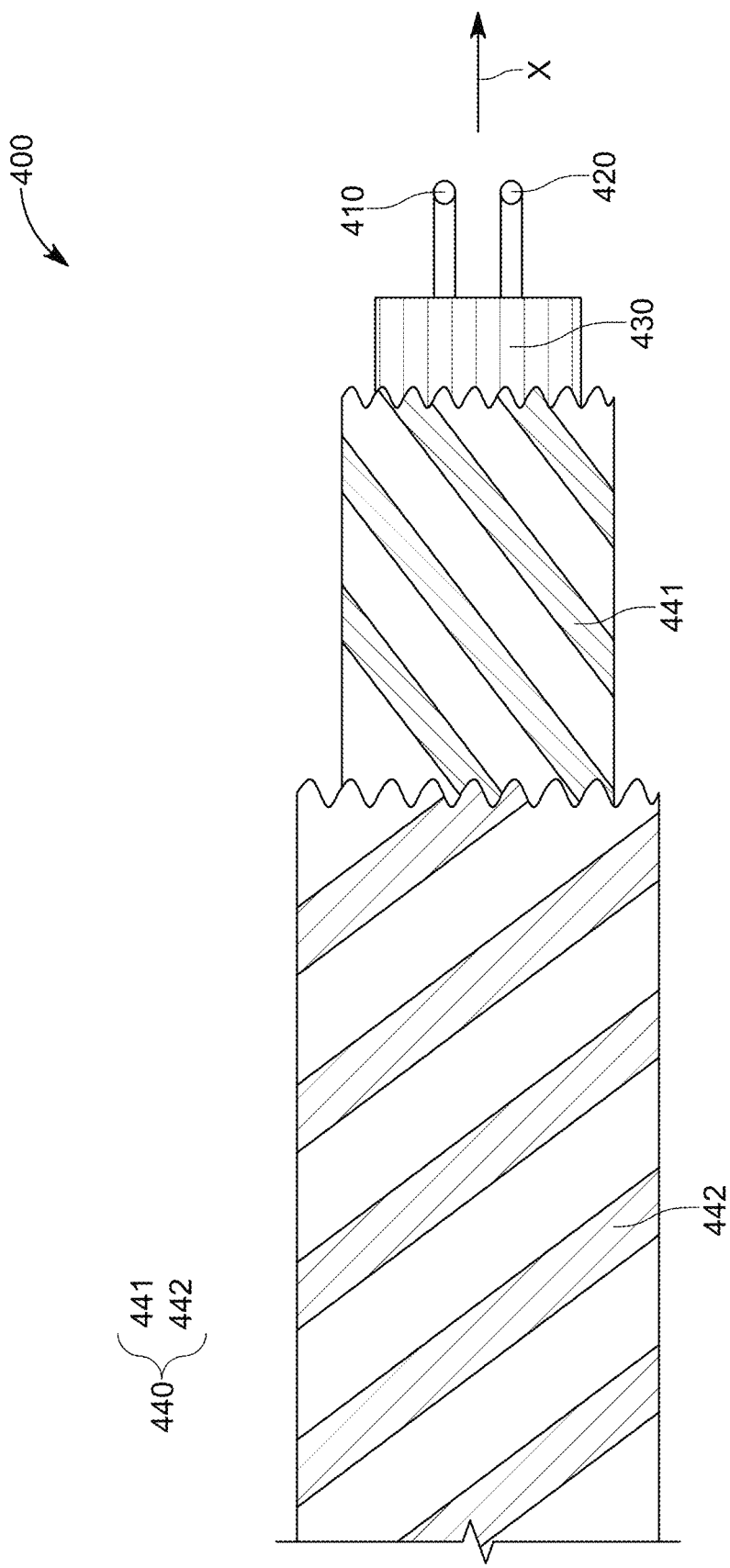
FIG. 4 shows a longitudinal section of the hybrid cable.

While FIG. 2 shows the electro-optical cable 202 having electrical cables and optical fibers and FIG. 3 shows the optical component 312 having electrical cables and optical fibers, the invention discussed herein is applicable to any element that includes electrical conductors and optical fibers. Such a structure that includes at least one electrical conductor and one optical fiber is called herein a hybrid cable or wireline. FIG. 4 shows a hybrid cable 400 that includes both an electrical cable 410 and an optical fiber 420 that extend along a longitudinal axis X of the hybrid cable. The term "electrical cable" is indicative for any configuration filling the function mentioned, namely, it is used also for a simple electrical conductor, or a bundle of electrical conductors, or coaxial cables or any other configuration. Similarly, the term "optical fiber" is to be understood as also covering bundles of optical fibers or other cables containing at least one optical fiber. The hybrid cable 400 can be the electro-optical cable 202 or the optical component 312 discussed above. FIG. 4 shows for simplicity only one electrical conductor 410 and only one optical fiber 420 located inside the hybrid cable 400. However, one skilled in the art would know that any number of electrical conductors and any number of optical fibers may be placed inside the hybrid cable. The electrical cable and the optical fiber may be placed in a filler material 430, for example, cotton. Other materials used in the art may be employed. FIG. 4 also shows armoring cables 440 (or simply armor 440), which are placed to fully encircle the electrical cable and the optical fiber to protect them from damage when lowered into the well, and also to provide mechanical strength to the entire hybrid cable 400 when hanging vertically in the well. Armoring cables 440 are here formed with inner mechanical cables 441 and outer mechanical cables 442 which extend along a longitudinal X direction, and these cables are wounded around the electrical cable 410 and the optical cable 420 with an inclination angle, and the inclination angles are opposite for the inner and outer mechanical cables. Any other configuration for the armor 440 is possible, with also a presence of only the inner mechanical cables 441. The term "armoring cables" is understood to characterize elements which surround the center of the hybrid cable 400 and have a mechanical supporting function.

Figure 5A:
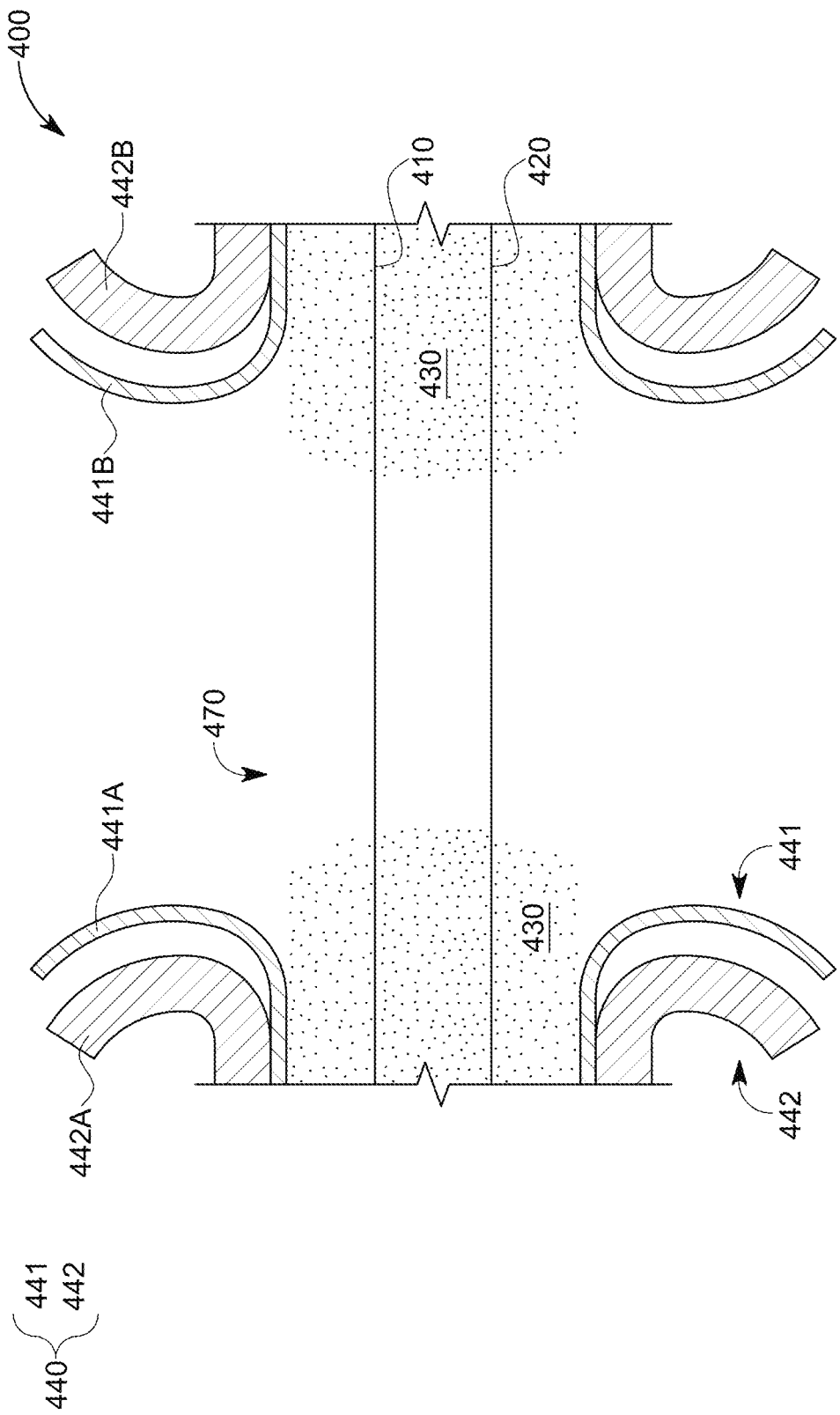

To attach a take-out port to the hybrid cable 400, so that an electrical signal or an optical signal or both can be taken out along the hybrid cable 400, at any desired location, according to the embodiment illustrated in FIG. 5A, the inner and outer mechanical cables 441 and 442 are cut at the desired location 470, along the hybrid cable 400, where the take-out port would be installed, and the inner and outer mechanical cables are peeled off to free the electrical cable 410 and the optical fiber 420. The filler material 430 may be removed at this location.

A connecting device 500 is then inserted between the ends 441A and 441B of the inner mechanical cables 441 and the ends 442A and 442B of the outer mechanical cables 442 as illustrated in FIG. 5B. The connecting device 500 fully encloses the electrical conductor 410 and the optical fiber 420. Further, the ends 500A and 500B of the connecting device 500 are fully encircled or covered by the armoring cables 440. The connecting device 500 has a length L that is much shorter than a length of the hybrid cable 400. For example, the hybrid cable 400 may have a length of up to a few km while a length of the connecting device is in the order of cm or dm, but not longer than one or two meters.

Figure 6:
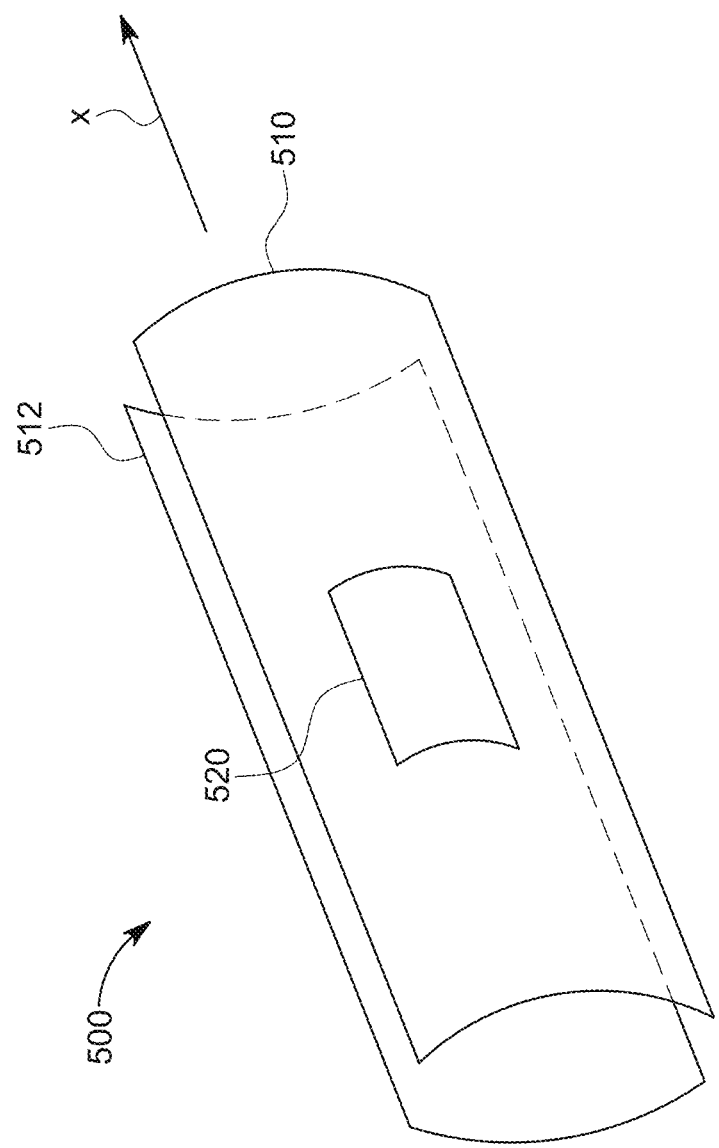
FIG. 6 illustrates the connecting device.

To place the connecting device 500 around the electrical cable 410 and the optical fiber 420, the connecting device 500 may be formed from two or more parts. For example, FIG. 6 shows the connecting device 500 being formed from two halves 510 and 512 that extend along the longitudinal axis X. The two halves may be connected or not to each other. At least one part of the two halves 510 and 512 has a through slot 520, where the take-out port would be installed and electrical and/or optical leads are taken out of the hybrid cable.

Figure 5C:
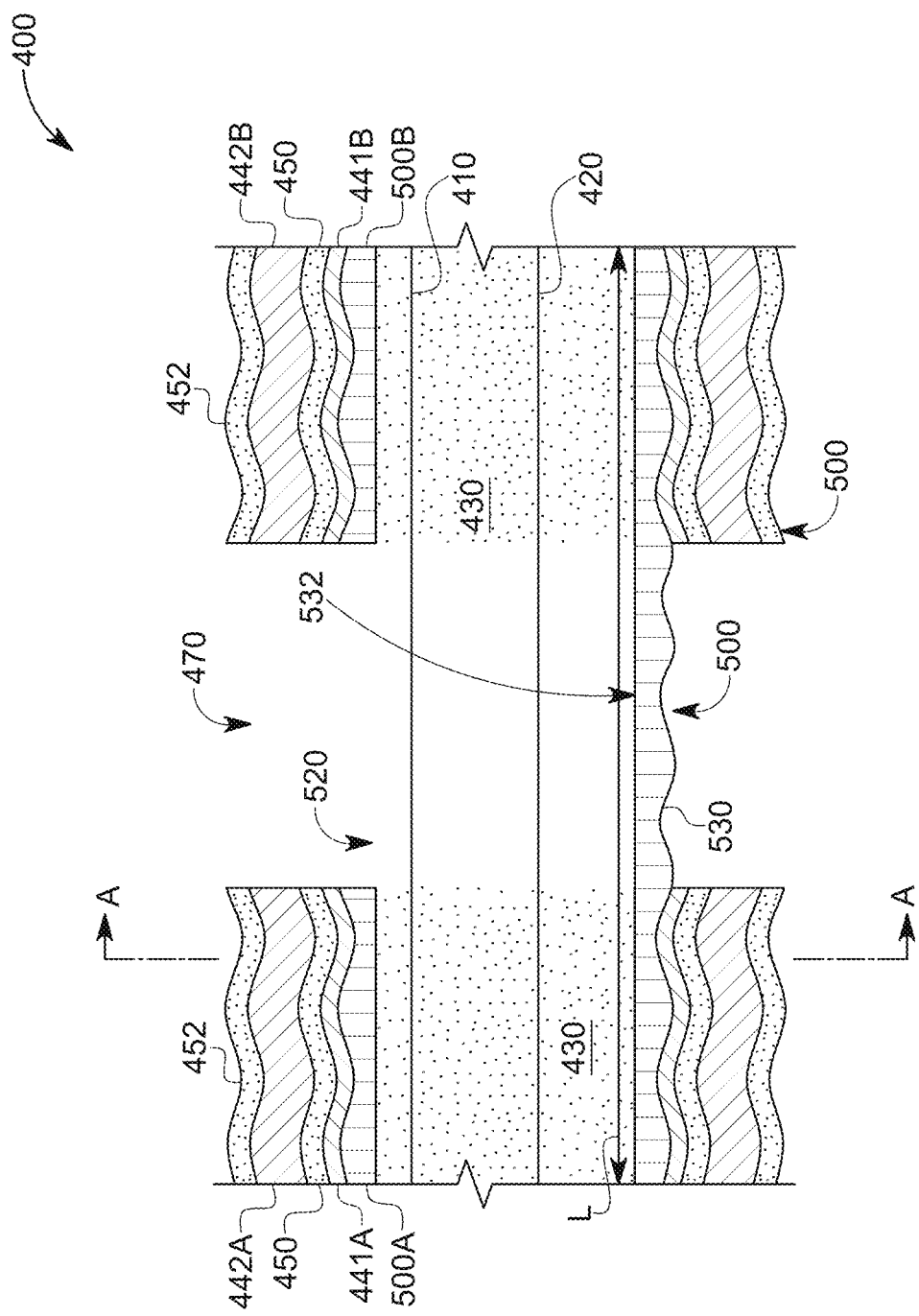

Returning to FIG. 5B, it is noted that an external surface 530 of the connecting device 500 has a non-uniform shape, i.e., it is unsmooth. The shape of the external surface 530 contrasts the smooth shape of the internal surface 532. This unsmooth (wavy) external surface 530 of the connecting device 500 is made on purpose for enabling the inner and outer mechanical cable ends 441A, 441B, 442A and 442B to be swaged to the external surface, as shown in FIG. 5C. While this embodiment is discussed with regard to inner and outer mechanical cables, those skilled in the art would understand that the same is true if any other armor 440 configuration is used (i.e., with less or more cables, or with other armoring elements). The unsmooth external surface 530 can have a random shape or a parametric shape, a shape described by a given function, e.g., a sine function.

FIG. 5C shows that a first swage band 450 is placed between the inner mechanical cables 441 and the outer mechanical cables 442, and a second swage band 452 is placed to fully encircle the outer mechanical cables 442. The first and second swage bands 450 and 452 are full bands that extend about the connection device 500, i.e., they are closed, and originally they may have a circular circumference, while the inner and outer mechanical cables are plural cables that are disposed along the connection device. In other words, the swage bands have the circumference extending perpendicular to the length of the inner and outer mechanical cables. A single swage band may be used to fix the armoring cables 440 to the connecting device.

A cross-section of the system shown in FIG. 5C, along line A-A, is shown in FIG. 5D. The connecting device 500 is shown having two halves 512 and 514, each half having the unsmooth external surface 530. The two swage bands 450 and 452 are not set in this figure, i.e., they were not compressed with a compressing tool (not shown) to conform to the shape of external surface 530 of the connecting device 500, as in FIG. 5C. When the swage bands 450 and 452 and the inner and outer mechanical cables 440 and 442 are set with the compression tool, the air gaps 454 shown in FIG. 5D are diminished, if not eliminated, as illustrated in FIG. 5C. FIG. 5C also shows the through slot 520 formed in the connecting device 500, which allows access to the electrical cable 410, the optical fiber 420 or both of them.

Figure 5E:
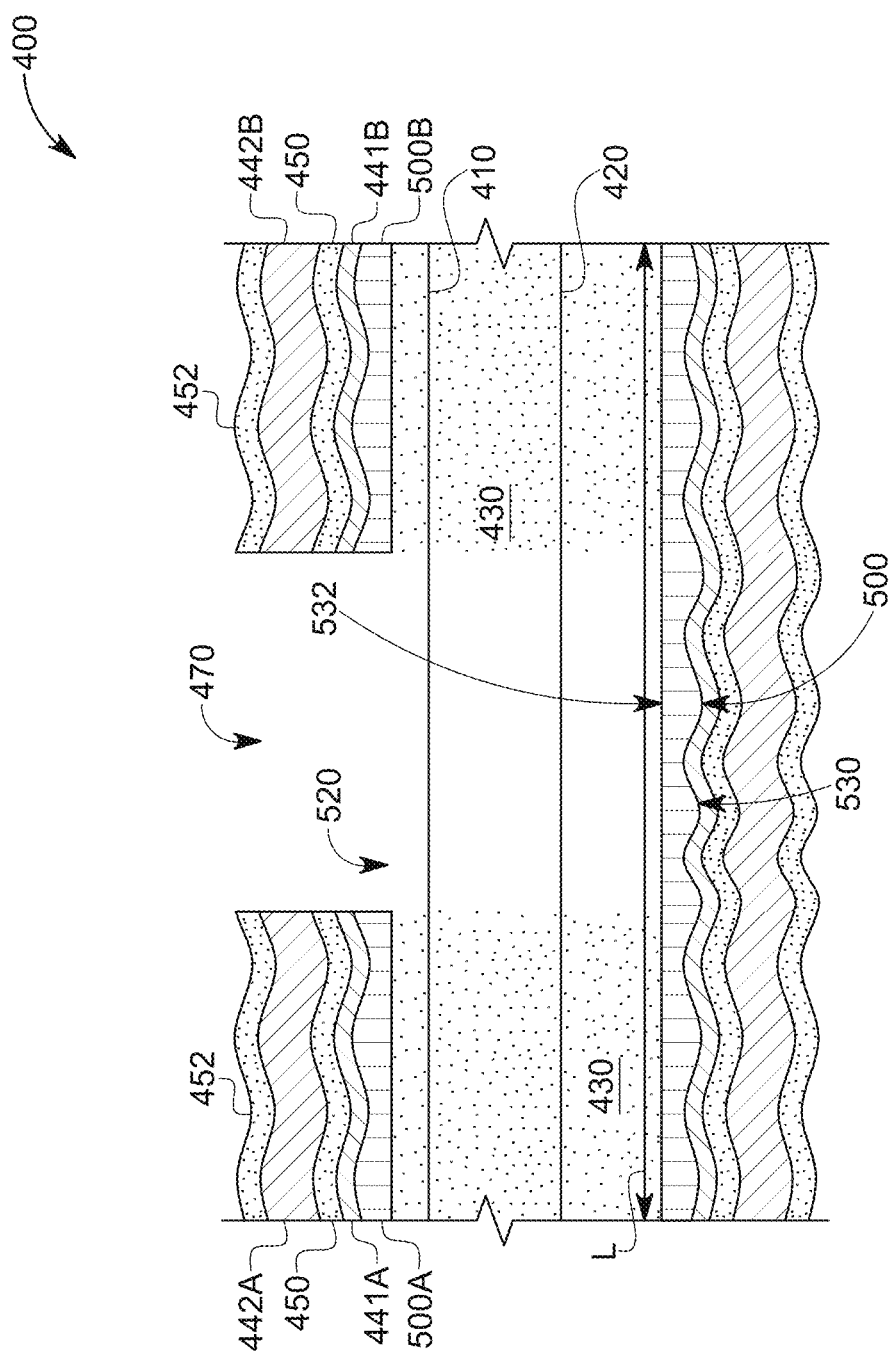

FIG. 5E shows another embodiment in which not all the armoring cables 440 are cut to introduce the connecting device 500. In this regard, note that FIG. 5C shows that all the armoring cables 440 have been cut around the electrical cable 410 and the optical fiber 420 at the given location 470 and then all these inner and outer mechanical cable ends have been swaged with the first and second swage bands against the outer surface 530 of the connecting device 500. However, FIG. 5E shows that some of the inner and outer mechanical cables 441 and 442 were not cut (see the bottom of the figure). Note that this is possible because the connecting device 500 is made from two or more parts and these parts can be inserted under the inner and outer mechanical cables trough the region where the cables were cut (upper part of the figure), and then these parts can slid into place as desired.

Irrespective of the way in which the connecting device 500 is added to the hybrid cable 400, parts of the armoring cables 440 are overlaying the connecting device 500, and after these cables are swaged against the unsmooth external surface 530 of the connecting device 500, the cables intimately conform to the unsmooth external surface 530 as illustrated in FIGS. 5C and 5E. The interaction between the unsmooth external surface 530 and the swaged inner and outer mechanical cables prevents the mechanical cables to slide away from the connecting device 500 when the hybrid cable 400 is placed in the well. The first and second swage bands 450 and 452 further prevent this slippage.

The material used for swage bands, connecting device, and the inner and outer mechanical cables may include steel, any metal, titanium, or any other material that is strong and also plastic enough to undertake the swage procedure. The presence of the connecting device 500 allows to maintain the armor of the hybrid cable, and thus to protect the electrical cable and the optical fiber present inside the connecting device 500. The connecting device 500 further maintains the cable breaking strength, and allows the installation of electronics outside the hybrid cable. Moreover, should it be of use due to interruption of the complete armor, the connecting device 500 is configured to maintain the electrical connection between the armor cables 440 of the hybrid cable 400. Similarly, the connecting device 500 might be configured to maintain the electrical connection between the armor cables 440 of the hybrid cable and the housing of the external device, as discussed later.

Figure 7:
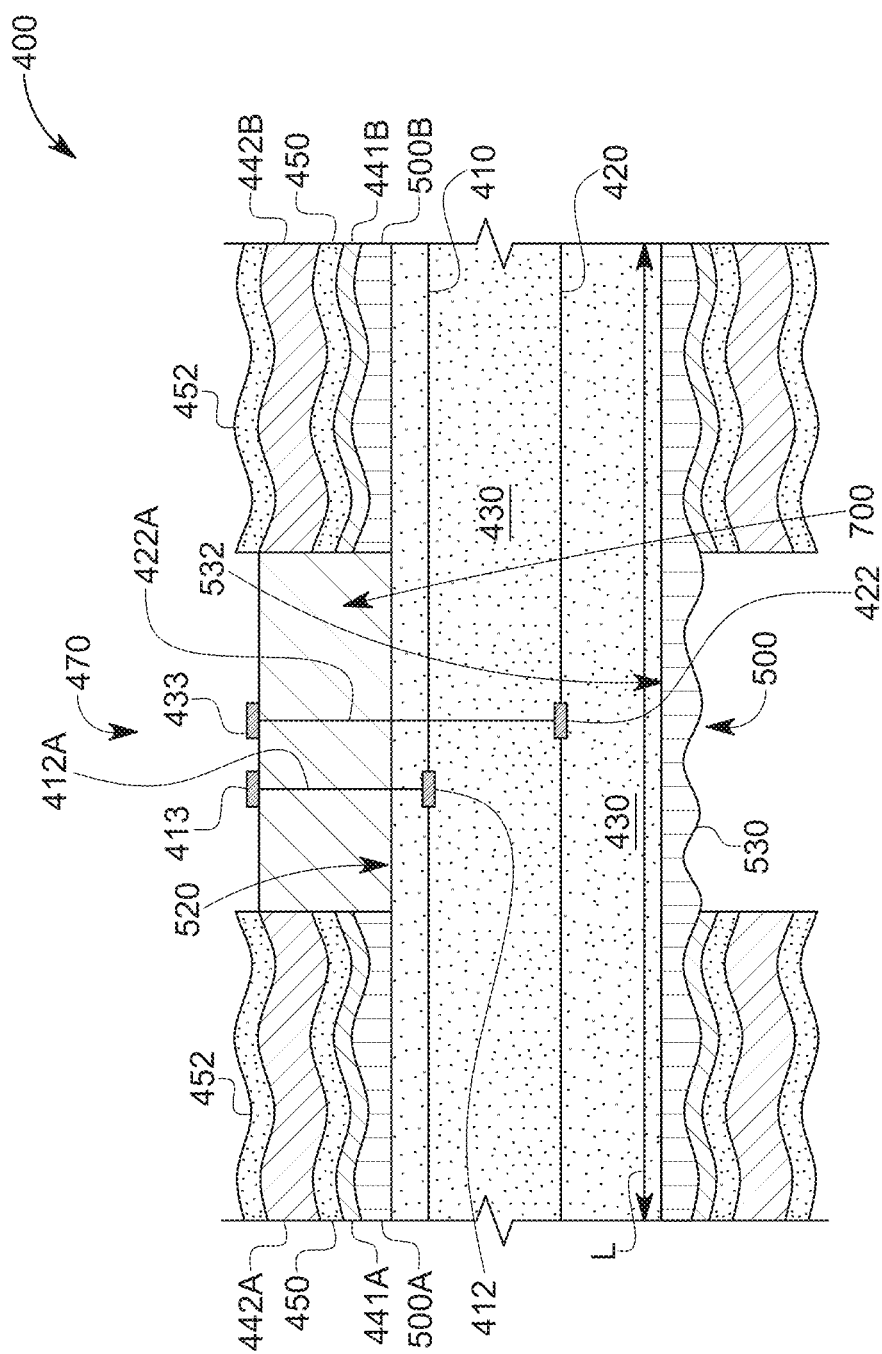
FIG. 7 illustrates a take-out port that is attached to the connecting device.

Just prior or after adding the connecting device 500 around the electrical cable 410 and the optical fiber 420, an electrical connector 412, or an optical connector 422, or both may be added to the hybrid cable 400, as shown in FIG. 7. The electrical connection may be an inductive connection, i.e., the electrical cable 410 is not tampered with, or a direct connection, in which case the electrical cable 410 is cut to achieve the connection. Alternatively, preferably not at the most downstream (or deepest) take-out position for avoiding propagation of the signal up to the lower end of the hybrid cable 400, the electrical connection may be a T-connection wherein only part of the (bundled) electrical cable 410 is cut, as shown. The optical connector 422 may be implemented as a beam splitter or as a tapping connection, as known in the art. Corresponding leads 412A and 422A are extending from these connections outside the hybrid cable 400 as also shown in FIG. 7.

A take-out port 700 may be added to completely close the through slot 520 and allow, at the same time, the leads 412A and 422A to pass through. Thus, the take-out port 700 and the connecting device 500 form a system for taking out a signal from the hybrid cable 400, for example, an electrical signal, an optical signal, or both. In one application, the leads 412A and 422A terminate at corresponding pads 413 and 433, on the outside surface of the take-out port 700. Note that if only electrical power or an electrical signal need to be taken out of the hybrid cable 400, the take-out port 700 includes only the electrical pad 413. The same is true if only an optical signal is desired to be taken out, then only the optical pad 433 is present on the outside surface of the take-out port 700. However, if both electrical and optical signals are necessary to be taken out of the hybrid cable, then both pads are present. The pads may be implemented based on the existing standards to have any shape or size. The take-out port 700 may be made of an insulator material and may be sized to press fit inside the through slot 520, to securely be attached to the connecting device 500. Although FIG. 7 shows a single electrical connector 412 and a single optical connector 422, this is so because the figure represents the hybrid cable 400 in a simplified way, by having a single electrical cable 410 and a single optical fiber 420. However, if the hybrid cable 400 has plural electrical cables and plural optical fibers, than plural electrical and/or optical connectors may be used to collect electrical and/or optical signals.

Figure 8:
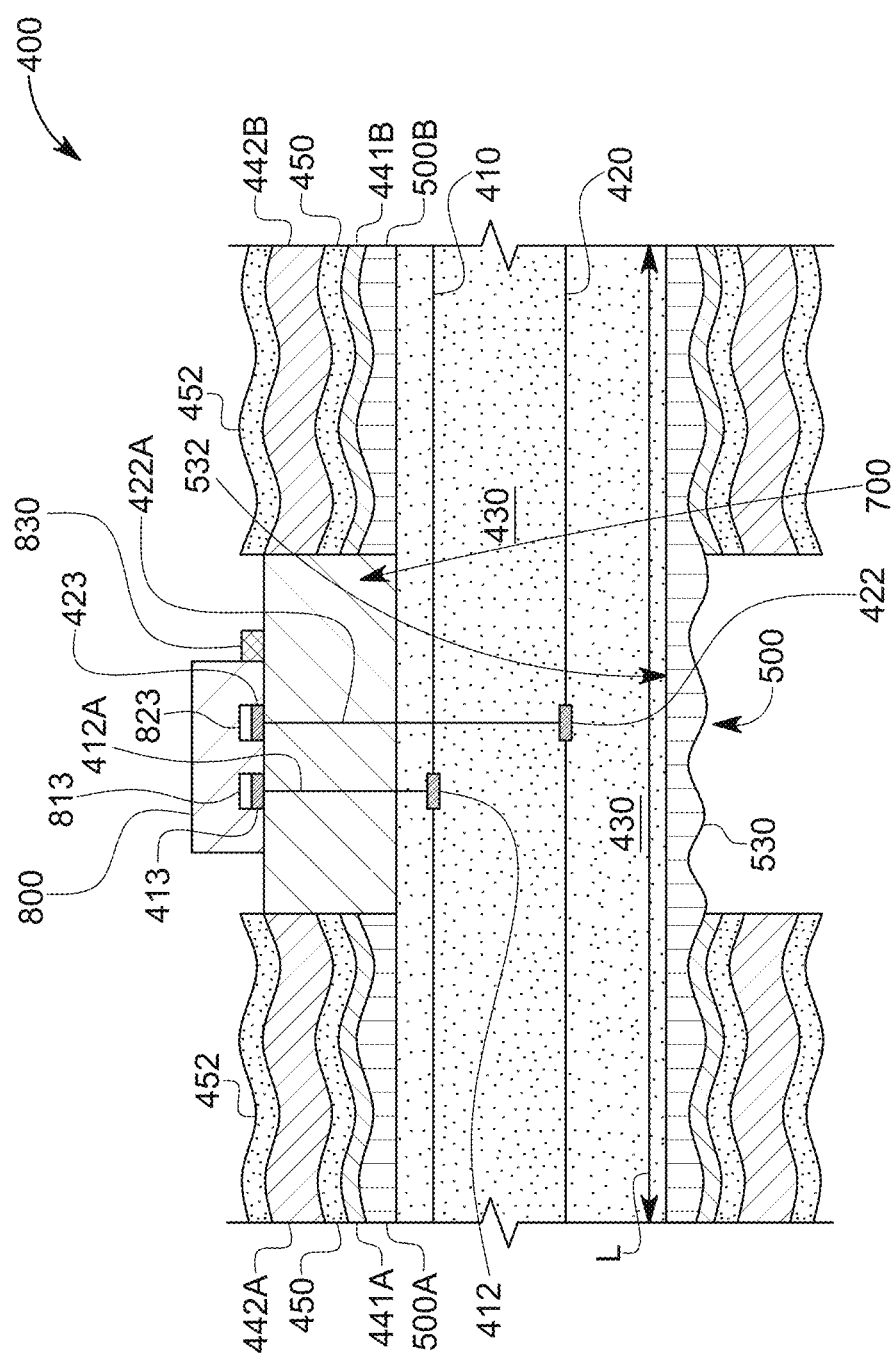
FIG. 8 illustrates an external device that is attached to the take-out port.

Having the take-out port 700 in place, an external device 800, as shown in FIG. 8, may be attached to this port. However, note that the take-out port 700 does not require the presence of the external device 800. In other words, after the installation of the take-out port 700, it is possible to seal out the pad 413 and/or the pad 433 and to have a "blind" take-out port. The external device 800 may be attached to connect only to the electrical pad 413 or only to the optical pad 423, or to both of them. If a connection to the electrical pad 413 is desired, then the external device 800 may have a corresponding electrical pad 813 that directly connects to the electrical pad 413. If a connection to the optical pad 423 is desired, then the external device 800 may have a corresponding optical pad 823 that directly connects to the optical pad 423. In one application, the external device 800 may have both the electrical and the optical pads. Plural electrical and/or optical pads may be present on the external device 800 corresponding to the electrical and optical pads that are present on the take-out port 700. A connecting mechanism 830 may be used to secure the external device 800 to the take-out port 700. In one application, the connecting mechanism 830 is a screw. More sophisticated connecting mechanisms may be used as known in the art.

The external device 800 may be an electrical device, an optical device or a mixture of them. For example, in one embodiment, the external device is an electromagnet that connects only to electrical pad(s) 413 for receiving electrical current. In this way, when the wireline formed by the hybrid cable 400 is lowered into a well 900, as illustrated in FIG. 9, the external device 800 is made to act as a magnet by controlling the electrical current that is sent along the electrical cables 410, so that the wireline 400 is attracted to the well casing 910. By having these points of actual contact between the hybrid cable 400 and the well casing 910 (note that FIG. 9 exaggerates the size of the external device 800 for a better viewing of the various elements of the hybrid cable), the optical fiber is better coupled (closer to the well casing) to detect seismic or other information coming from the area 920 around the well casing. FIG. 9 also shows the possibility of having two take-out plugs 700A and 700B corresponding to the same connecting device 500, and the external device 800 being connected simultaneously to both of these take-out plugs. Also, it is possible that the external device 800 connects to a first take-out plug that is attached to a first connecting device, and also connects to a second take-out plug, that is attached to a second connecting device.

Figure 10A:
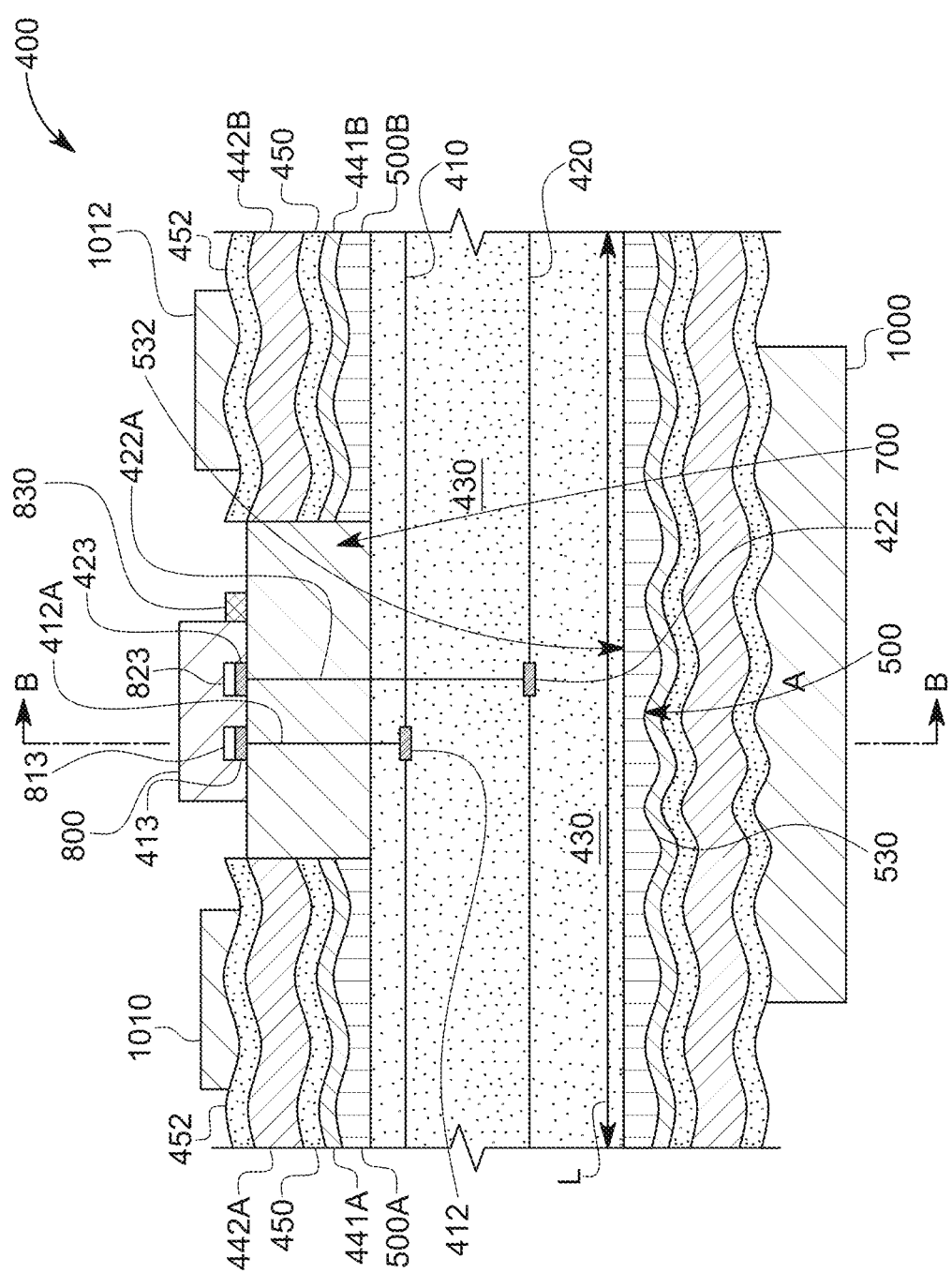
FIGS. 10A and 10B illustrate the hybrid cable having the connecting device inserted without cutting all the mechanical cables.
Figure 10B:
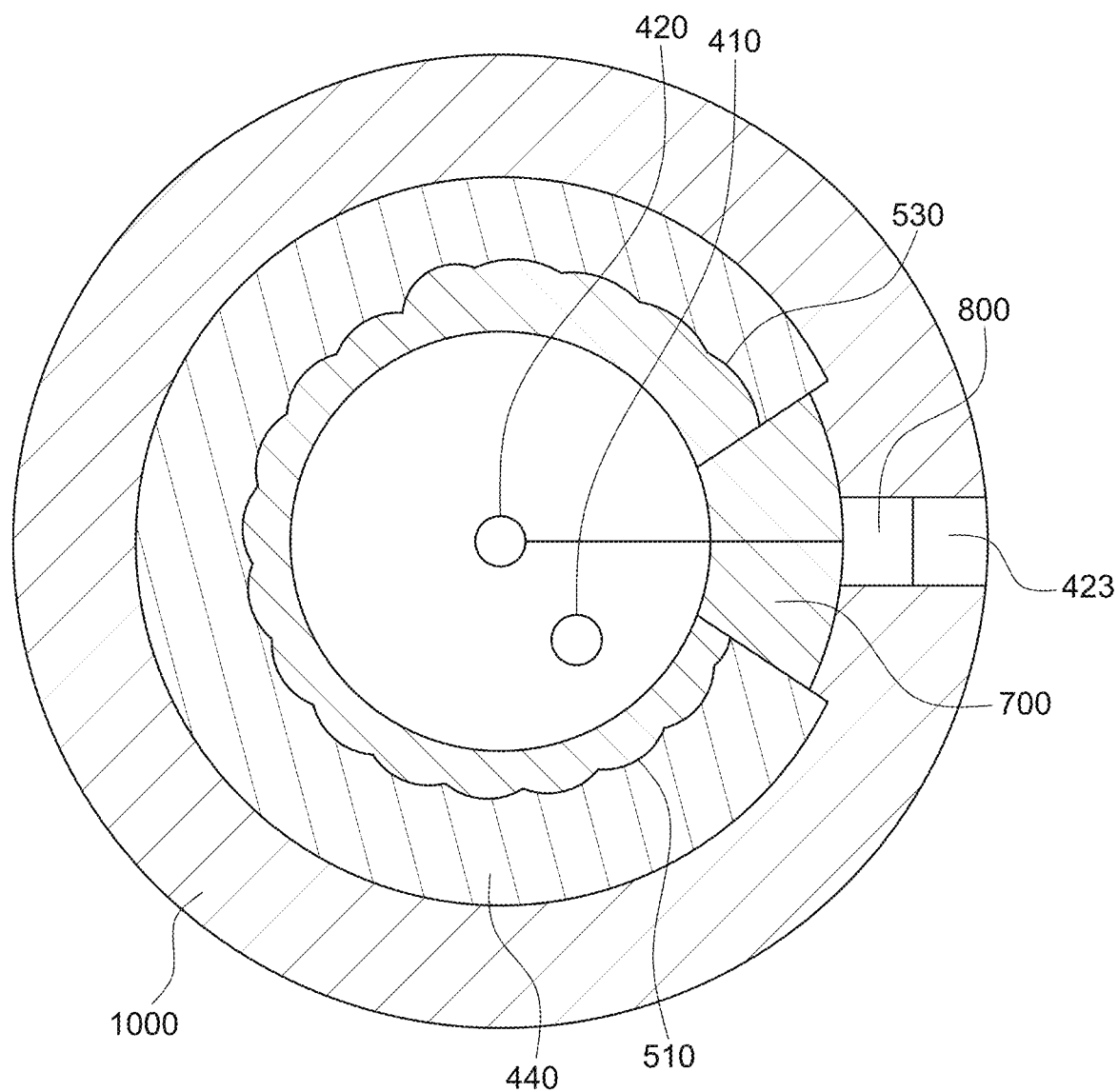

In another embodiment as illustrated in FIGS. 10A and 10B, it is possible to add a passive magnetic clamp 1000 so that the passive magnetic clamping attaches to the internal wall of the well casing when the hybrid cable 400 is placed in the well. In this way, the hybrid cable is intimately attached to the well casing. The passive magnetic clamp 1000 may include a permanent magnetic material. If the external device 800 is an electromagnet, it is considered to be an active magnet as it needs electrical energy to achieve the magnetic coupling to the well casing while the passive magnetic clamp 1000 achieves the same function without using any electrical energy. The passive magnetic clamp 1000 may be attached to the hybrid cable 400 with clamps 1010 and 1012, that may be swaged to the inner and outer mechanical cables and the first and second swage bends, as also shown in FIG. 10A. Other means for attaching the passive magnetic clamping to the hybrid cable may be used. Passive magnetic clamping is only one option for the clamp 1000 which may be attached by any other means. FIG. 10B illustrates a cross-section through the hybrid cable 400, where the external device 800 is located.

Figure 11:
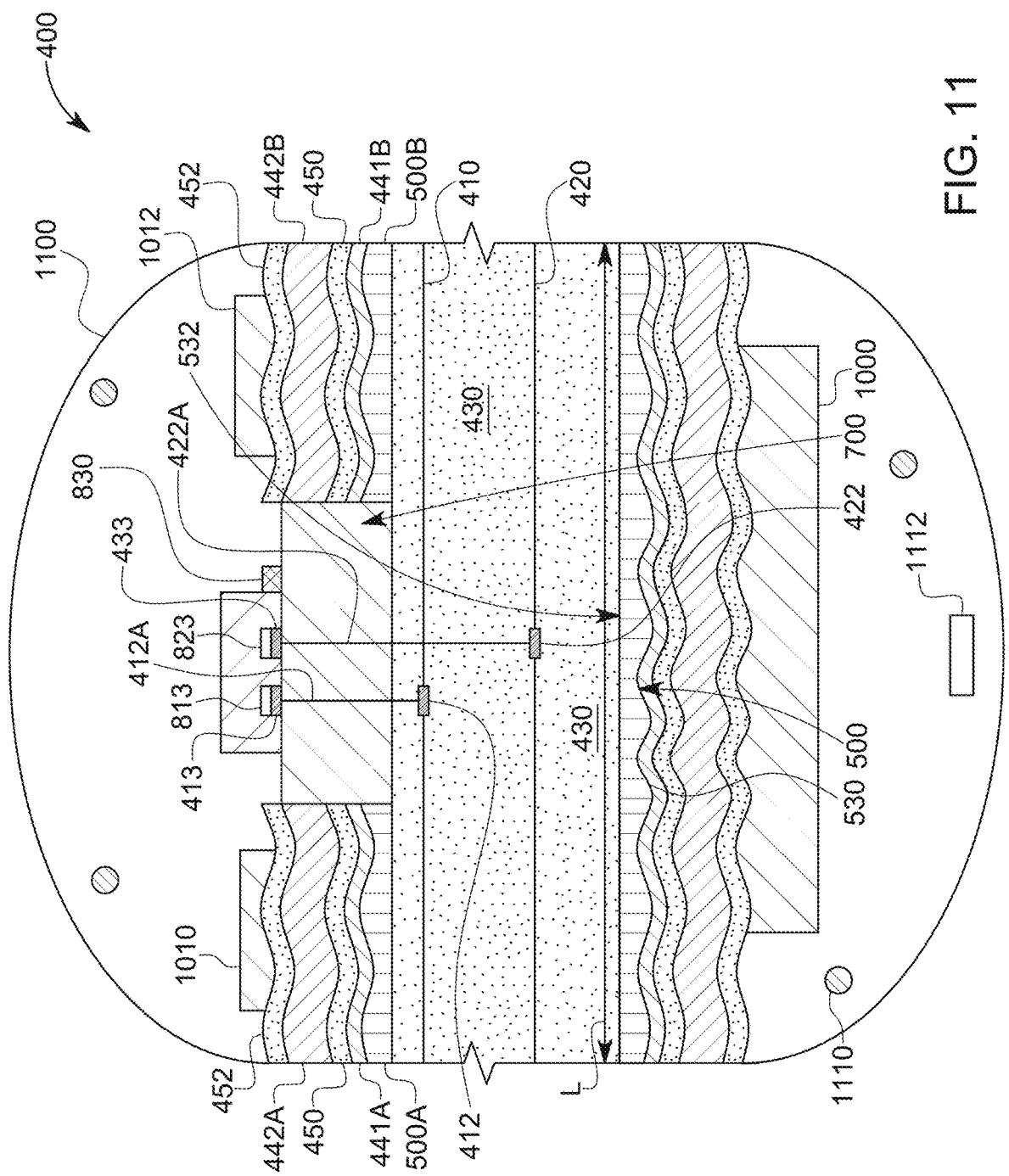
FIG. 11 illustrates the hybrid cable having an external housing that protects the take-out port and/or the external device.

In another embodiment, as illustrated in FIG. 11, a protection housing 1100 can be added over the take-out port 700 (for example, to fully cover the take-out port), and/or the external device 800, and/or the passive magnetic clamp 1000 so that one or more of these elements are not damaged while the hybrid cable 400 is lowered into the well. The housing 1100 can be made from two or more parts, which are attached to each other, over the above noted elements, with any means, for example, integrated magnets 1110. In another embodiment, the integrated magnets 1110 are used to intimately contact the hybrid cable 400 to the well casing and another closing mechanism 1112 is used to secure together the parts of the housing 1100. The housing 1100 may be made from composite, plastic, or similar materials that withstand friction with the well casing and also withstand the high temperatures and various corrosive liquids that may be present inside the well. It is noted that the housing 1100 can be used with the hybrid cable 400 without the need of having the take-out plug 700, or the external device 800.

The hybrid cable 400 may be used to generate a seismic image of the well's surroundings. The hybrid cable 400 may be used with the sensor array 222 having seismic sensors (in the probes), in the well. A seismic source (not shown) located on the ground or in a different well, is shot for generating seismic waves. The seismic waves propagate from the seismic source into the ground and then they get reflected and/or refracted on various geophysical underground structures. Part of these reflected and/or refracted waves propagate toward the seismic sensors located in the discrete probes and also impinge on the one or more optical fibers 420 and are recorded by these sensors and by a computing device that is connected to the one or more optical fibers. Based on the recorded seismic signals, an image of the oil and gas reservoir around the well is determined. By monitoring these images, one skilled in the art is able to estimate the "health" of the well, whether an intervention is necessary to increase the well production, i.e., to manage the well.

Figure 12:
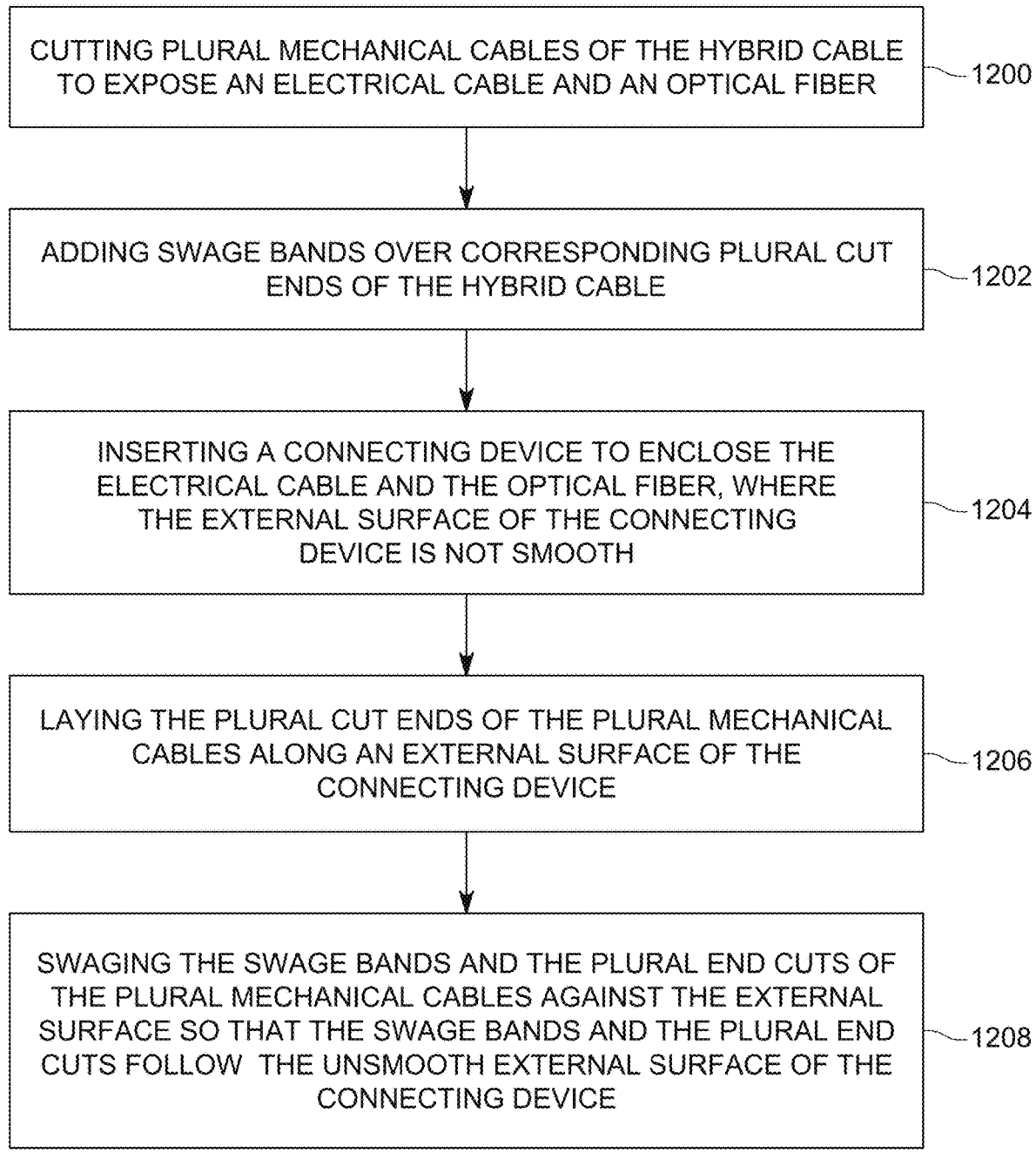
FIG. 12 is a flowchart of a method for attaching the connecting device to the hybrid cable.

A method for adding the take-out port 700 to the hybrid cable 400 is now discussed with regard to FIG. 12. The method includes a step 1200 of cutting the armor 440 of the hybrid cable 400 to expose an electrical conductor 410 and an optical fiber 420, a step 1202 of adding swage bands 450 over corresponding plural cut ends 440A, 440B of the hybrid cable 400, a step 1204 of inserting the connecting device 500 to enclose the electrical cable 410 and the optical fiber 420, where the external surface 530 of the connecting device 500 is not smooth, a step 1206 of laying the plural cut ends 440A, 440B of the plural mechanical cables 440 along the unsmooth external surface 530 of the connecting device 500, a step 1208 of swaging the swage bands 450 and the plural end cuts 440A, 440B of the plural mechanical cables 440 against the external surface 530 so that the swage bands 450 and the plural end cuts 440A, 440B follow the unsmooth external surface 530 of the connecting device 500.

The method may further include a step of connecting an electrical connector or an optical connector to one of the electrical cable or the optical fiber inside the hybrid cable, a step of placing the take-out plug 700 over the slot 520 of the connecting device 500, a step of connecting corresponding pads of the take-out plug 700 to leads of the electrical or optical connectors, a step of adding the external device 800 to the take-out plug 700, a step of adding an external housing 1100 over the take-out plug 700 and/or the external device 800, a step of lowering the hybrid cable into a well, a step of activating the external device (if an electromagnet) to contact the hybrid cable to the well casing, and a step of recording data with the optical fiber. The method may further include a step of recoding seismic data with a sensor array, in parallel to the recording of the data with the optical fiber.

The disclosed embodiments provide an apparatus and method for adding a take-out port to a hybrid cable. One or more of the embodiments discussed above allow to:

Provide a continuous DAS sensor above, along and below a series of seismic probes. This provides nearly complete well coverage with one single shot, while providing the benefits indicated below.

Provide a positioning accuracy to the optical fiber DAS measurement by the depth control of the seismic probes. This positioning accuracy is preferably achieved by associating a positioning tool like a gamma-ray sensor or a collar locator to an external device, at one or any take out; alternatively, it can be achieved by a range of methods, including but not limited to, seismic transit time check, noise or heat trace detection of the seismic shuttle adjacent to the fiber, or fiber deformation.

Allow to keep a discrete measuring directivity, and compensate for the DAS directional blindness in the zone of interest, by placing discrete seismic shuttles in the zones of interest.

Allow to correct optical fiber directional response by combining DAS single component measurement with three component measurement.

Allow to compensate and calibrate optical fiber sensitivity during acquisition by using the signal of the seismic shuttles.

Allow a better coupling between optical fiber and borehole wall by pushing the fiber to the wellbore with the seismic shuttle's coupling (anchoring) device.

Allow a better calibration of the DAS sensor.

Allow to use the hybrid cable above, along, and below a seismic array that is distributed inside a well.

Compensate for the DAS directional blindness by placing discrete seismic sensors (or the like) in the zone of interest.

Not compromising the mechanical strength of the optical component despite direct connection of external devices with the hybrid cable.

Allow to operate at higher temperature by prolongation of the optical fiber below the seismic array of seismic tools which have a more limited operating temperature range.

It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A hybrid cable for collecting data inside a well, the hybrid cable comprising:
   an electrical cable extending along a longitudinal axis of the hybrid cable;
   an optical fiber extending along the longitudinal axis;
   an armor that extends along the longitudinal axis, and encircles the electrical cable and the optical fiber;
   a connecting device extending along the longitudinal axis, to enclose the electrical cable and the optical fiber, and to be enclosed by the armor, the connecting device having an unsmooth external surface and a smooth inner surface; and
   a swage band located around the armor so that the swage band deforms the armor when clamped to the connecting device so that the armor and the swage band conform to the unsmooth external surface of the connecting device.

2. The hybrid cable of claim 1, wherein the armor comprise:
   plural inner mechanical cables, which encircle the connecting device, and plural outer mechanical cables, which encircle the plural inner mechanical cables and the connecting device.

3. The hybrid cable of claim 1, wherein the connecting device has a through slot that provides direct access to the electrical cable and the optical fiber.

4. The hybrid cable of claim 3, further comprising:
   a connector connected to the electrical cable or the optical fiber, the connector having a lead extending away from the connector.

5. The hybrid cable of claim 4, further comprising:
   a take-out plug placed in the through slot,
   wherein the lead extends through the take-out plug and ends at a corresponding pod on an exterior surface of the take-out plug.

6. The hybrid cable of claim 5, wherein the connector is an electrical connector that is electrically connected to the electrical cable.

7. The hybrid cable of claim 5, further comprising:
   an external device connected to the take-out plug.

8. The hybrid cable of claim 7, wherein the external device comprises a positioning tool.

9. The hybrid cable of claim 7, wherein the external device is an electromagnet that is fed with electrical power through the lead of the connector, and the connector is an electrical connector electrically connected to the electrical cable.

10. The hybrid cable of claim 8, further comprising:
    an external housing configured to fully cover the take-out plug.

11. The hybrid cable of claim 1, further comprising:
    a passive magnetic clamp attached over the swage band.

12. The hybrid cable of claim 1, wherein a length of the connecting device along the longitudinal axis is shorter than a total length of the hybrid cable.

13. A hybrid cable for collecting data inside a well, the hybrid cable, comprising:
   an electrical cable extending along a longitudinal axis of the hybrid cable;
   an optical fiber extending along the longitudinal axis;
   an armor that extends along the longitudinal axis and encircles the electrical cable and the optical fiber;
   a connecting device extending along the longitudinal axis, to enclose the electrical cable and the optical fiber, and to be enclosed by the armor, the connecting device having a through slot that provides direct access to the electrical cable and the optical fiber;
   a connector connected to the electrical cable or the optical fiber, the connector having a lead extending away from the connector; and
   a take-out plug placed in the through slot,
   wherein the connecting device has an unsmooth external surface, and the lead extends through the take-out plug and ends at a corresponding pod on an exterior surface of the take-out plug.

14. The hybrid cable of claim 13, further comprising:
   an external device connected to the take-out plug.

15. The hybrid cable of claim 14, wherein the external device comprises
   a positioning tool or the external device is an electromagnet that is fed with electrical power through the lead of the connector, and the connector is an electrical connector electrically connected to the electrical cable.

16. The hybrid cable of claim 13, wherein a length of the connecting device along the longitudinal axis is shorter than a total length of the hybrid cable.

17. A hybrid cable for collecting data inside a well, the hybrid cable comprising: an electrical cable extending along a longitudinal axis of the hybrid cable; an optical fiber extending along the longitudinal axis; an armor that extends along the longitudinal axis, and encircles the electrical cable and the optical fiber; a connecting device extending along the longitudinal axis, to enclose the electrical cable and the optical fiber, and to be enclosed by the armor, wherein the connecting device has an unsmooth external surface; a swage band located around the armor so that the swage band deforms the armor when clamped to the connecting device and the armor and the swage band conform to the unsmooth external surface of the connecting device; and a passive magnetic clamp attached over the swage band.

18. The hybrid cable of claim 17, wherein a length of the connecting device along the longitudinal axis is shorter than a total length of the hybrid cable.

\* \* \* \* \*